US012645284B2

(12) United States Patent
Germer et al.

(10) Patent No.: US 12,645,284 B2
(45) Date of Patent: Jun. 2, 2026

(54) OBJECT POSITIONING AND MOVEMENT IN THREE DIMENSIONAL CONTENT

(71) Applicant: APPLE INC., Cupertino, CA (US)

(72) Inventors: Austin C. Germer, Novato, CA (US);
Gregory Duquesne, Belmont, CA (US);
Novaira Masood, Sunnyvale, CA (US);
Ryan S. Burgoyne, Sunnyvale, CA
(US)

(73) Assignee: Apple Inc., Cupertino, CA (US)

( * ) Notice: Subject to any disclaimer, the term of this patent is extended or adjusted under 35 U.S.C. 154(b) by 325 days.

(21) Appl. No.: 17/392,825

(22) Filed: Aug. 3, 2021

(65) Prior Publication Data

US 2021/0365107 A1     Nov. 25, 2021

Related U.S. Application Data

(63) Continuation of application No. PCT/US2020/016914, filed on Feb. 6, 2020.

(Continued)

(51) Int. Cl.
| | |
|---|---|
| *G06F 3/01* | (2006.01) |
| *G06F 3/04815* | (2022.01) |
| *G06T 19/00* | (2011.01) |

(52) U.S. Cl.
CPC .......... G06F 3/011 (2013.01); G06F 3/04815 (2013.01); G06T 19/00 (2013.01); *G06T 2210/21* (2013.01)

(58) Field of Classification Search
CPC ...... G06F 3/011; G06F 3/04815; G06F 1/163; G06F 3/017; G06F 3/0304; G06F 3/0346;

(Continued)

(56) References Cited

U.S. PATENT DOCUMENTS 5,680,619 A * 10/1997 Gudmundson ....... G06F 16/289
                                                    717/109
6,014,145 A *  1/2000 Bardon .................. G06T 15/10
                                                    345/474

(Continued)

FOREIGN PATENT DOCUMENTS

KR        101608172 B      3/2016
KR    1020180070681 A      6/2018

(Continued)

OTHER PUBLICATIONS

PCT, European Patent Office (ISA/EP), International Search Report and Written Opinion, International Application No. PCT/US2020/016914, 12 pages (May 15, 2020).

(Continued)

*Primary Examiner* — Jose R Soto Lopez
(74) *Attorney, Agent, or Firm* — Thompson Hine LLP

(57)     ABSTRACT

Various implementations disclosed herein include devices, systems, and methods that enable more intuitive and efficient positioning of an object in a 3D layout, for example, in an enhanced reality (ER) setting providing on a device. In some implementations, objects are automatically positioned based on simulated physics that is selectively enabled during the positioning of the object. In some implementations, objects are automatically positioned based on simulated physics and alignment rules. In some implementations, objects are automatically grouped together based on criteria such that a first object that is grouped with a second object moves with the second object automatically in response to movement of the second object but is moveable independent of the second object.

30 Claims, 8 Drawing Sheets

Related U.S. Application Data

(60) Provisional application No. 62/802,978, filed on Feb. 8, 2019.

(58) Field of Classification Search
CPC ...... G06F 9/455; G06F 9/451; G06F 9/45504; G06T 19/00; G06T 2210/21; G06T 19/20; G06T 2219/2004
See application file for complete search history.

(56) References Cited

U.S. PATENT DOCUMENTS

| | | | | |
|---|---|---|---|---|
| 6,377,263 | B1 * | 4/2002 | Falacara | G06N 3/006 |
| | | | | 345/473 |
| 8,704,823 | B1 * | 4/2014 | Waggoner | G06T 19/20 |
| | | | | 345/428 |
| 9,058,058 | B2 * | 6/2015 | Bell | G06F 3/011 |
| 9,329,469 | B2 * | 5/2016 | Benko | G02B 27/017 |
| 9,740,383 | B2 * | 8/2017 | Swindell | G06F 3/013 |
| 9,928,661 | B1 * | 3/2018 | Kinstner | A63F 13/20 |
| 10,754,422 | B1 * | 8/2020 | Hoyt | G06F 9/45529 |
| 10,926,176 | B1 * | 2/2021 | Snyder | G06T 13/60 |
| 2003/0132973 | A1 * | 7/2003 | Hughes | G06F 3/04815 |
| | | | | 715/850 |
| 2005/0253846 | A1 * | 11/2005 | Russ | G06T 19/20 |
| | | | | 345/473 |
| 2006/0149516 | A1 * | 7/2006 | Bond | A63F 13/45 |
| | | | | 703/6 |
| 2008/0010041 | A1 * | 1/2008 | McDaniel | G06F 30/12 |
| | | | | 703/1 |
| 2009/0079734 | A1 * | 3/2009 | McDaniel | G06T 19/00 |
| | | | | 345/419 |
| 2009/0099824 | A1 * | 4/2009 | Falash | H04L 67/131 |
| | | | | 703/8 |
| 2009/0253517 | A1 * | 10/2009 | Bererton | A63F 13/71 |
| | | | | 463/43 |
| 2009/0307623 | A1 * | 12/2009 | Agarawala | G06F 3/04815 |
| | | | | 345/173 |
| 2011/0113383 | A1 * | 5/2011 | Dyack | A63F 13/5252 |
| | | | | 715/850 |
| 2012/0229391 | A1 * | 9/2012 | Skinner | G06F 3/04883 |
| | | | | 345/173 |
| 2013/0127878 | A1 * | 5/2013 | Tijssen | G06T 13/00 |
| | | | | 345/474 |
| 2013/0147794 | A1 * | 6/2013 | Lee | G06F 3/04842 |
| | | | | 345/419 |
| 2013/0286004 | A1 * | 10/2013 | McCulloch | G06T 19/006 |
| | | | | 345/419 |
| 2013/0305218 | A1 * | 11/2013 | Hirsch | G06F 8/30 |
| | | | | 717/106 |
| 2014/0031103 | A1 * | 1/2014 | Amano | A63F 13/10 |
| | | | | 463/23 |
| 2014/0287397 | A1 * | 9/2014 | Chong | G09B 5/12 |
| | | | | 434/350 |
| 2014/0289703 | A1 * | 9/2014 | Mueller | G06F 8/30 |
| | | | | 717/121 |
| 2015/0310643 | A1 * | 10/2015 | Rzeszotarski | G06T 13/80 |
| | | | | 345/441 |
| 2016/0049003 | A1 * | 2/2016 | Shuster | A63F 13/355 |
| | | | | 386/230 |
| 2016/0071320 | A1 * | 3/2016 | Smith | G06T 19/006 |
| | | | | 345/633 |
| 2016/0179336 | A1 * | 6/2016 | Ambrus | G02B 27/017 |
| | | | | 715/768 |
| 2016/0364088 | A1 * | 12/2016 | Bejot | G06F 3/04842 |
| 2017/0031502 | A1 * | 2/2017 | Rosenberg | G06F 3/04166 |
| 2017/0038830 | A1 * | 2/2017 | Clement | G06F 3/04847 |
| 2017/0104661 | A1 | 4/2017 | Anastasi | |
| 2017/0357407 | A1 * | 12/2017 | Palmaro | G06F 3/017 |
| 2018/0045963 | A1 * | 2/2018 | Hoover | G02B 30/34 |
| 2018/0046738 | A1 * | 2/2018 | Park | G06T 19/006 |
| 2018/0060948 | A1 * | 3/2018 | Mattingly | G06Q 30/0643 |
| 2018/0082486 | A1 * | 3/2018 | Hagbi | G06T 19/006 |
| 2018/0189974 | A1 * | 7/2018 | Clark | G06N 3/08 |
| 2018/0268609 | A1 * | 9/2018 | Schneider | G06F 3/04815 |
| 2019/0065642 | A1 * | 2/2019 | Simic | G06F 30/20 |
| 2019/0371071 | A1 * | 12/2019 | Lyons | G06T 7/246 |
| 2019/0378340 | A1 * | 12/2019 | Chia | G06F 30/13 |
| 2020/0098154 | A1 * | 3/2020 | Marinier | G06F 3/0486 |
| 2020/0150750 | A1 * | 5/2020 | Suzuki | G06F 3/0488 |
| 2020/0387289 | A1 * | 12/2020 | Dunn | G06T 19/20 |
| 2021/0042023 | A1 * | 2/2021 | Kerber, III | G06F 8/65 |
| 2021/0064122 | A1 * | 3/2021 | Fujinawa | G06T 19/006 |
| 2021/0089628 | A1 * | 3/2021 | Mitrovic | G06T 13/20 |
| 2021/0089629 | A1 * | 3/2021 | Mitrovic | G06F 17/13 |
| 2024/0025035 | A1 * | 1/2024 | Ganguly | B25J 9/1671 |

FOREIGN PATENT DOCUMENTS

| | | |
|---|---|---|
| TW | 200513959 A | 4/2005 |
| WO | 2015050826 A1 | 4/2015 |

OTHER PUBLICATIONS

Korean Intellectual Property Office, Notice of Preliminary Rejection (with English translation), Korean Patent Application No. 10-2021-7024817, 14 pages, Apr. 22, 2024.

Chen, Long et al., "Context-Aware Mixed Reality: A Framework for Ubiquitous Interaction," arXiv preprint arXiv:1803.05541, 11 pages, Mar. 14, 2018.

Nuernberger, Benjamin et al., "SnapToReality: Aligning Augmented Reality to the Real World," Proceedings of the 2016 CHI Conference on Human Factors in Computing Systems, 12 pages, May 7, 2016.

China National Intellectual Property Administration, Patent Search Report (with English translation), Chinese Patent Application No. 202080013118.1 , 4 pages, Jul. 10, 2024.

China National Intellectual Property Administration, Chinese Office Action issued Jan. 17, 2024 which pertains to Chinese Patent Application No. 2020800131181. 4 pgs.

Intellectual Property India, Examination Report, Indian Patent Application No. 202117035962, 7 pages, May 10, 2022.

* cited by examiner

Controller 110

CPU(s)
202

Comm.
Interface(s)
208

Memory 220

204

Operating System 230

ER Module 240

3D Content Creation Unit 242

Object Positioning Unit 244

I/O Device(s)
206

Programming
Interface(s)
210

Device 120

CPU(s)
302

Comm.
Interface(s)
308

Display(s)
312

Memory 320

304

Operating System 330

ER Module 340

3D Content Creation Unit 342

Object Positioning Unit 344

I/O Device(s)
& Sensor(s)
306

Programming
Interface(s)
310

Image Sensor
System(s)
314

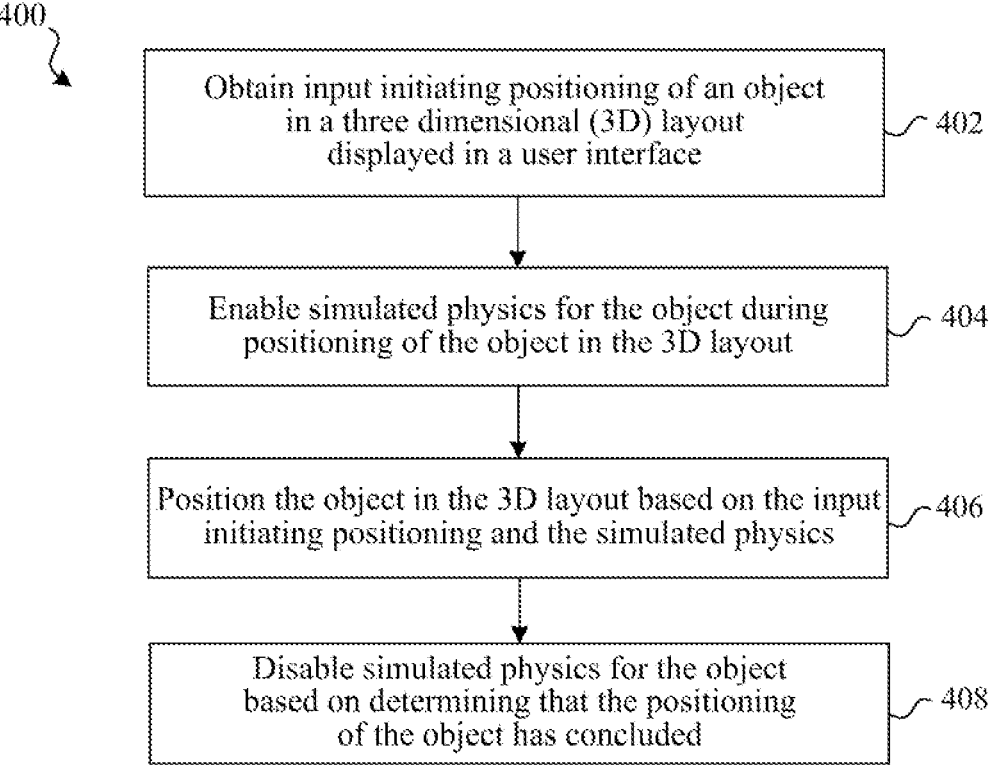

400

Obtain input initiating positioning of an object
in a three dimensional (3D) layout
displayed in a user interface          402

Enable simulated physics for the object during
positioning of the object in the 3D layout          404

Position the object in the 3D layout based on the input
initiating positioning and the simulated physics          406

Disable simulated physics for the object
based on determining that the positioning
of the object has concluded          408

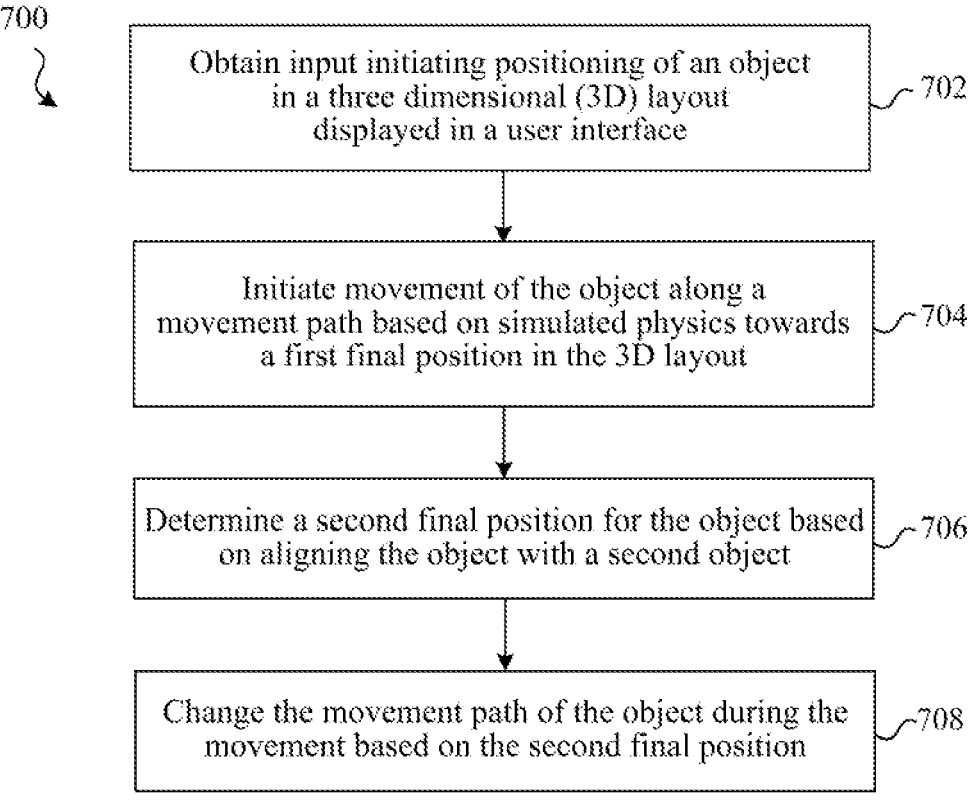

Obtain input initiating positioning of an object
in a three dimensional (3D) layout
displayed in a user interface                    ⟋ 702

Initiate movement of the object along a
movement path based on simulated physics towards    ⟋ 704
a first final position in the 3D layout Determine a second final position for the object based    ⟋ 706
on aligning the object with a second object Change the movement path of the object during the    ⟋ 708
movement based on the second final position

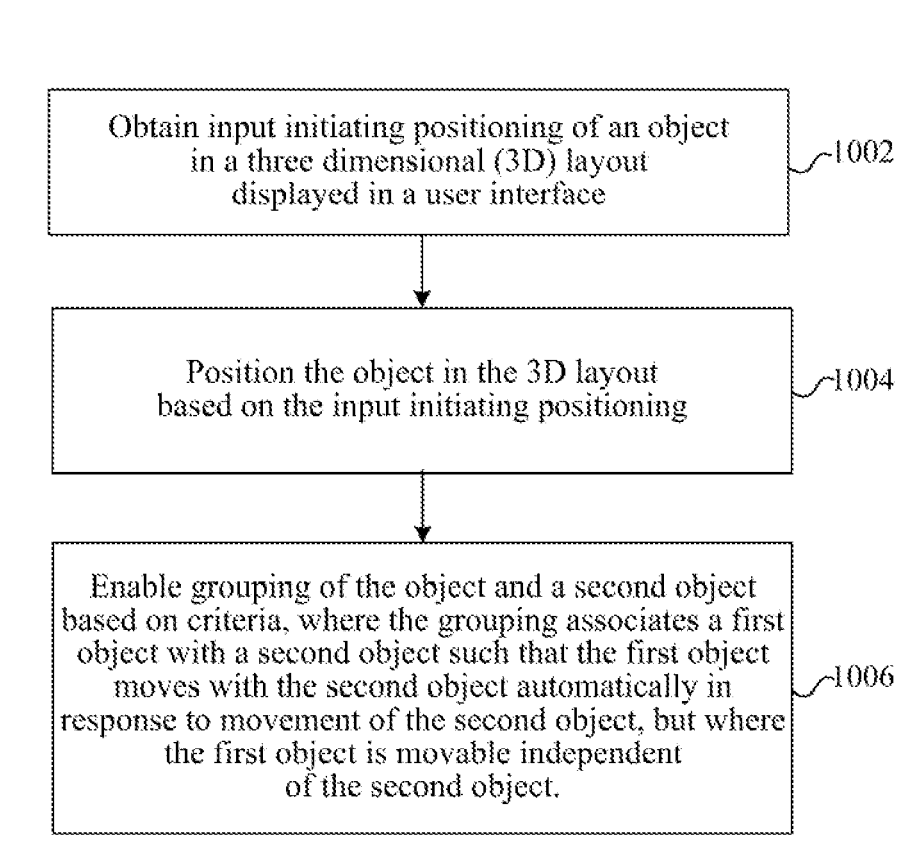

1000

Obtain input initiating positioning of an object
in a three dimensional (3D) layout
displayed in a user interface          1002

Position the object in the 3D layout
based on the input initiating positioning          1004

Enable grouping of the object and a second object
based on criteria, where the grouping associates a first
object with a second object such that the first object
moves with the second object automatically in
response to movement of the second object, but where
the first object is movable independent
of the second object.          1006

FIG. 10

OBJECT POSITIONING AND MOVEMENT IN THREE DIMENSIONAL CONTENT

TECHNICAL FIELD

The present disclosure generally relates to creating three dimensional (3D) content, and in particular, to systems, methods, and devices for inserting and positioning objects into such content in 3D layouts.

BACKGROUND

Creating 3D content can be very time consuming, non-intuitive, and difficult. Such creation often requires using a mouse or other computer-based input device to painstakingly position and rotate 3D objects in precise positions and relative to other 3D objects.

SUMMARY

Various implementations disclosed herein include devices, systems, and methods that enable more intuitive and efficient positioning of an object in a 3D layout.

In some implementations, an electronic device having a processor implements a method. The method obtains input initiating positioning of a displayed object at a position in a three dimensional (3D) graphical layout. After positioning the displayed object responsive to the obtained input, the method adjusts the position of the displayed object using at least one simulated physics model. As examples, the position of the displayed object may be translated in the 3D graphical layout according to simulated gravity and/or according to a collision of the displayed object with another object in the 3D graphical layout. After adjusting the position of the displayed object, the method disables the at least one simulated physics model for the displayed object.

In some implementations, an electronic device having a processor implements a method to position an object in a 3D layout by selectively using physics. The electronic device obtains input initiating positioning of an object in a 3D layout displayed in a user interface. For example, in an enhanced reality (ER) setting providing on a device, a user may select a virtual table object to add to a 3D layout of an app being developed, reach out a hand virtually holding the table, and release, drop, or throw the table from that location.

The electronic device enables simulated physics for the object during positioning of the object in the 3D layout. In some implementations, physics is enabled for only the object and not enabled for other objects. In some implementations, physics is enabled for the object and other selected objects that are selected based on selection criteria, e.g., to enable the user to use the table to push a sofa while preventing the user from unintentionally knocking over a floor vase.

The electronic device positions the object in the 3D layout based on the input initiating positioning and the simulated physics. In one example, the user drops the table and the table will fall to a position on the floor based on simulated gravity. In another example, the user pushes a chair and the chair will stop moving when the chair hits a wall based on simulating the physical interaction between the chair and the wall. The movement of the object can be based on simulated physics alone or simulated physics and additional movement influencers, such as alignment criteria that results in the object moving to a position that aligns with another object. The electronic device disables the simulated physics for the object and any other objects for which simulated physics was enabled during the positioning process based on determining that the positioning of the object has concluded. For example, once the object has been placed, physics may be turned off for the object and related objects.

In some implementations, an electronic device having a processor implements a method to move an object in a 3D layout to a position based on simulated physics and alignment criteria. The electronic device obtains input initiating positioning of an object in a 3D layout displayed in a user interface. For example, in an ER setting providing on a device, a 3D app creator or other user may select a chair object to add to a layout of an app being developed and drop the chair above a location near a table. The electronic device initiates movement of the object along a movement path towards a first final position in the 3D layout. For example, the first final position may be on the floor near one side of the table. The first final position is determined based on simulated physics. While the object begins moving to the first final position, the device determines a second final position for the object based on aligning the object with a second object that is identified based on the first final position. For example, as the chair starts to move towards the floor, the device may quickly identify that the chair will land near the table and calculate a different final position for the chair that better aligns with the table. The electronic device changes the movement path of the object during the movement based on the second final position. For example, the chair's movement path may be changed to blend the physics-based positioning with the alignment-based positioning. This may provide a smoother movement that is less jarring or otherwise objectionable to the user.

In some implementations, an electronic device having a processor implements a method of enabling grouping during object placement based on criteria where the grouping associates a first object with a second object such that the first object moves with the second object automatically in response to movement of the second object, but where the first object is movable independent of the second object. The electronic device obtains input initiating positioning of an object in a three dimensional (3D) layout displayed in a user interface. For example, in an ER setting providing on a device, a 3D app creator or other user may select a vase object to add to a layout of an app being developed, reach out, and release or drop the vase onto a table. The electronic device positions the object in the 3D layout based on the input initiating positioning, for example, selecting a position on the table based on simulating a fall of the object based on simulated gravity. The electronic device enables grouping of the object and a second object based on criteria, e.g., proximity, surface type, object type, etc. Based on the grouping, the object moves with the second object automatically in response to movement of the second object, but the object is moveable independent of the second object. In the vase/table example, the vase moves when the table is moved but the vase can be moved independently of the table.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart illustrating an exemplary method of selectively using physics for scene creation, according to some implementations.

FIG. 7 is a flowchart illustrating an exemplary method of moving an object during placement of the object in a scene according to simulated physics and to align with another object, according to some implementations.

FIG. 10 is a flowchart illustrating an exemplary method of enabling grouping during object placement based on criteria according to some implementations.

Figure 1:
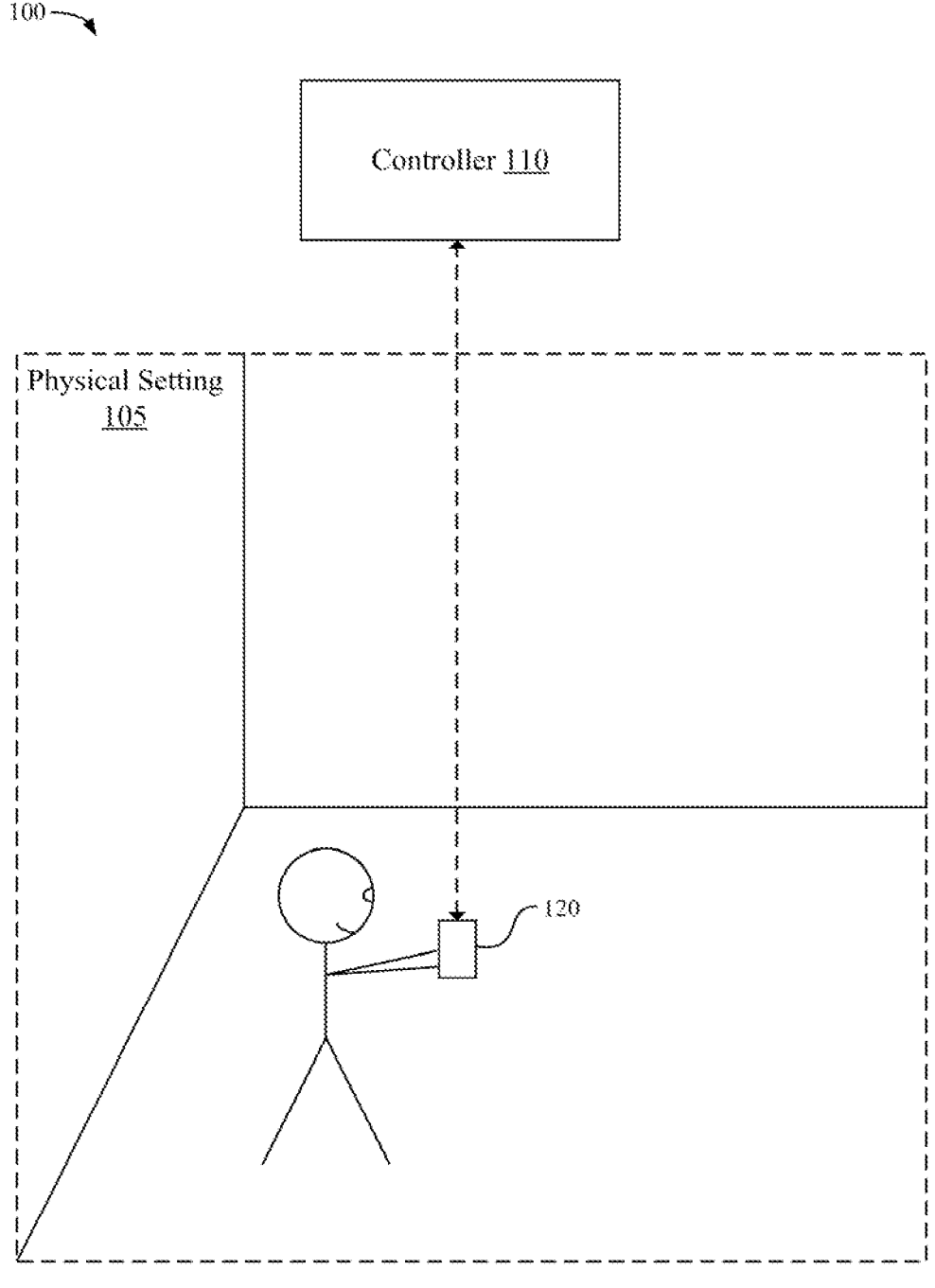
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120, one or both of which may be in a physical setting 105. A physical setting refers to a world with which various persons can sense and/or interact without use of electronic systems. Physical settings, such as a physical park, include physical elements, such as, for example, physical wildlife, physical trees, and physical plants. Persons can directly sense and/or otherwise interact with the physical setting, for example, using one or more senses including sight, smell, touch, taste, and hearing.

In some implementations, the controller 110 is configured to manage and coordinate an enhanced reality (ER) experience for the user. The user may be a content creator or a consumer of the ER experience. In some implementations, the controller 110 includes a suitable combination of software, firmware, or hardware. The controller 110 is described in greater detail below with respect to FIG. 2. In some implementations, the controller 110 is a computing device that is local or remote relative to the physical setting 105.

In one example, the controller 110 is a local server located within the physical setting 105. In another example, the controller 110 is a remote server located outside of the physical setting 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present the ER experience to the user. In some implementations, the device 120 includes a suitable combination of software, firmware, or hardware. The device 120 is described in greater detail below with respect to FIG. 3. In some implementations, the functionalities of the controller 110 are provided by or combined with the device 120.

According to some implementations, the device 120 presents an enhanced reality (ER) experience to the user while the user is present within the physical setting 105. An enhanced reality (ER) setting, in contrast to a physical setting, refers to an entirely (or partly) computer-produced setting that various persons, using an electronic system, can sense and/or otherwise interact with. In ER, a person's movements are in part monitored, and, responsive thereto, at least one attribute corresponding to at least one virtual object in the ER setting is changed in a manner that is consistent with one or more physical laws. For example, in response to an ER system detecting a person looking upward, the ER system may adjust various audio and graphics presented to the person in a manner consistent with how such sounds and appearances would change in a physical setting. Adjustments to attribute(s) of virtual object(s) in an ER setting also may be made, for example, in response to representations of movement (e.g., voice commands).

A person may sense and/or interact with an ER object using one or more senses, such as sight, smell, taste, touch, and sound. For example, a person may sense and/or interact with objects that create a multi-dimensional or spatial acoustic setting. Multi-dimensional or spatial acoustic settings provide a person with a perception of discrete acoustic sources in multi-dimensional space. Such objects may also enable acoustic transparency, which may selectively incorporate audio from a physical setting, either with or without computer-produced audio. In some ER settings, a person may sense and/or interact with only acoustic objects.

Virtual reality (VR) is one example of ER. A VR setting refers to an enhanced setting that is configured to only include computer-produced sensory inputs for one or more senses. A VR setting includes a plurality of virtual objects that a person may sense and/or interact with. A person may sense and/or interact with virtual objects in the VR setting through a simulation of at least some of the person's actions within the computer-produced setting, and/or through a simulation of the person or her presence within the computer-produced setting.

Mixed reality (MR) is another example of ER. An MR setting refers to an enhanced setting that is configured to integrate computer-produced sensory inputs (e.g., virtual objects) with sensory inputs from the physical setting, or a representation of sensory inputs from the physical setting. On a reality spectrum, an MR setting is between, but does not include, a completely physical setting at one end and a VR setting at the other end.

In some MR settings, computer-produced sensory inputs may be adjusted based on changes to sensory inputs from the physical setting. Moreover, some electronic systems for presenting MR settings may detect location and/or orientation with respect to the physical setting to enable interaction between real objects (i.e., physical elements from the physical setting or representations thereof) and virtual objects. For example, a system may detect movements and adjust computer-produced sensory inputs accordingly, so that, for example, a virtual tree appears fixed with respect to a physical structure.

Augmented reality (AR) is an example of MR. An AR setting refers to an enhanced setting where one or more virtual objects are superimposed over a physical setting (or representation thereof). As an example, an electronic system may include an opaque display and one or more imaging sensors for capturing video and/or images of a physical setting. Such video and/or images may be representations of the physical setting, for example. The video and/or images are combined with virtual objects, wherein the combination is then displayed on the opaque display. The physical setting may be viewed by a person, indirectly, via the images and/or video of the physical setting. The person may thus observe the virtual objects superimposed over the physical setting. When a system captures images of a physical setting, and displays an AR setting on an opaque display using the captured images, the displayed images are called a video pass-through. Alternatively, a transparent or semi-transparent display may be included in an electronic system for displaying an AR setting, such that an individual may view the physical setting directly through the transparent or semi-transparent displays. Virtual objects may be displayed on the semi-transparent or transparent display, such that an individual observes virtual objects superimposed over a physical setting. In yet another example, a projection system may be utilized in order to project virtual objects onto a physical setting. For example, virtual objects may be projected on a physical surface, or as a holograph, such that an individual observes the virtual objects superimposed over the physical setting.

An AR setting also may refer to an enhanced setting in which a representation of a physical setting is modified by computer-produced sensory data. As an example, at least a portion of a representation of a physical setting may be graphically modified (e.g., enlarged), so that the modified portion is still representative of (although not a fully-reproduced version of) the originally captured image(s). Alternatively, in providing video pass-through, one or more sensor images may be modified in order to impose a specific viewpoint different than a viewpoint captured by the image sensor(s). As another example, portions of a representation of a physical setting may be altered by graphically obscuring or excluding the portions.

Augmented virtuality (AV) is another example of MR. An AV setting refers to an enhanced setting in which a virtual or computer-produced setting integrates one or more sensory inputs from a physical setting. Such sensory input(s) may include representations of one or more characteristics of a physical setting. A virtual object may, for example, incorporate a color associated with a physical element captured by imaging sensor(s). Alternatively, a virtual object may adopt characteristics consistent with, for example, current weather conditions corresponding to a physical setting, such as weather conditions identified via imaging, online weather information, and/or weather-related sensors. As another example, an AR park may include virtual structures, plants, and trees, although animals within the AR park setting may include features accurately reproduced from images of physical animals.

Various systems allow persons to sense and/or interact with ER settings. For example, a head mounted system may include one or more speakers and an opaque display. As another example, an external display (e.g., a smartphone) may be incorporated within a head mounted system. The head mounted system may include microphones for capturing audio of a physical setting, and/or image sensors for capturing images/video of the physical setting,. A transparent or semi-transparent display may also be included in the head mounted system. The semi-transparent or transparent display may, for example, include a substrate through which light (representative of images) is directed to a person's eyes. The display may also incorporate LEDs, OLEDs, liquid crystal on silicon, a laser scanning light source, a digital light projector, or any combination thereof. The substrate through which light is transmitted may be an optical reflector, holographic substrate, light waveguide, optical combiner, or any combination thereof. The transparent or semi-transparent display may, for example, transition selectively between a transparent/semi-transparent state and an opaque state. As another example, the electronic system may be a projection-based system. In a projection-based system, retinal projection may be used to project images onto a person's retina. Alternatively, a projection-based system also may project virtual objects into a physical setting, for example, such as projecting virtual objects as a holograph or onto a physical surface. Other examples of ER systems include windows configured to display graphics, headphones, earphones, speaker arrangements, lenses configured to display graphics, heads up displays, automotive windshields configured to display graphics, input mechanisms (e.g., controllers with or without haptic functionality), desktop or laptop computers, tablets, or smartphones.

Figures 2, 3:
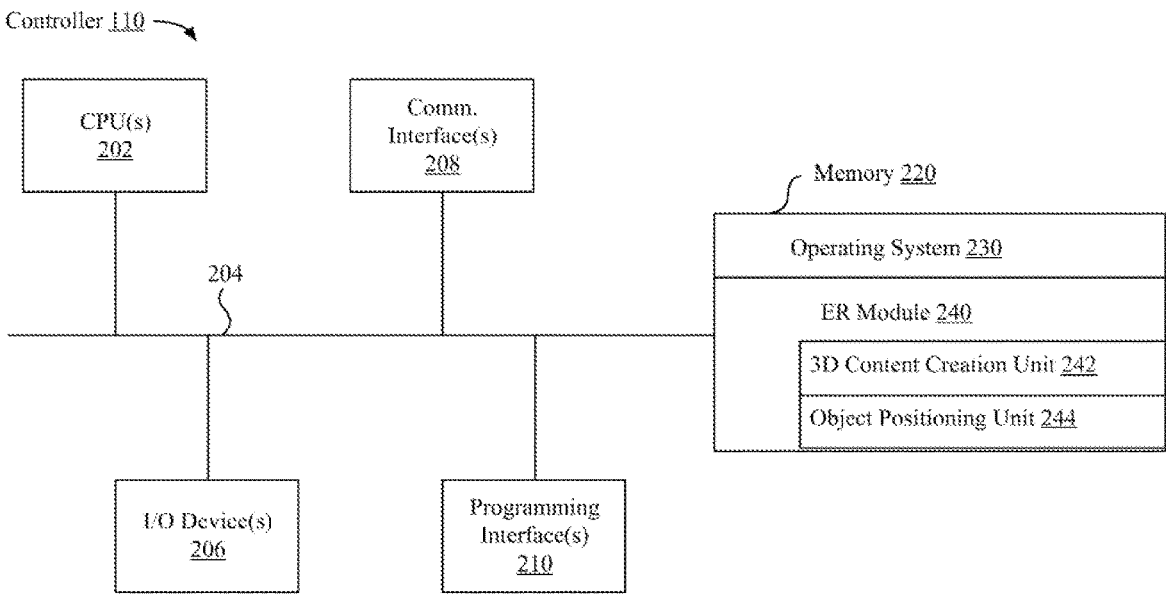
FIG. 2 is a block diagram of an example controller in accordance with some implementations.
FIG. 3 is a block diagram of an example device in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an ER experience module 240.

The operating system 230 includes procedures for handling various basic system services and for performing hardware dependent tasks. In some implementations, the ER module 240 is configured to create, edit, or experience ER experiences. The 3D content creation unit 242 is configured to create and edit 3D content that will be used as part of ER experiences for one or more users (e.g., a single ER experience for one or more users, or multiple ER experiences for respective groups of one or more users). A content-creation ER experience may be provided by the ER module 240 to facilitate the creation of such content. For example, the user may view and otherwise experience a ER-based user interface that allows the user to select, place, move, and otherwise configure virtual objects in 3D content that is being created or edited, for example, based on providing input via hand gestures, voice commands, input device inputs, etc. The object positioning unit 244 is configured to facilitate the positioning of objects during such a 3D content creation or editing experience using the positioning techniques disclosed herein, e.g., using simulated physics, alignment rules, grouping, etc. Although these modules and units are shown as residing on a single device (e.g., the controller 110), it should be understood that in other implementations, any combination of the these modules and units may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an ER experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the device 120 includes a single display. In another example, the device 120 includes a display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 33 and a ER module 340.

The operating system 330 includes procedures for handling various basic system services and for performing hardware dependent tasks. In some implementations, the ER module 340 is configured to create, edit, or experience ER experiences. The 3D content creation unit 342 is configured to create and edit 3D content that will be used as part of ER experiences for one or more users (e.g., a single ER experience for one or more users, or multiple ER experiences for respective groups of one or more users). A content creation ER experience may be provided by the ER module 340 to facilitate the creation of such content. For example, the user may view and otherwise experience a ER-based user interface that allows the user to select, place, move, and otherwise configure virtual objects in 3D content that is being created or edited, for example, based on providing input via hand gestures, voice commands, input device inputs, etc. The object positioning unit 344 is configured to facilitate the positioning of objects during such a 3D content creation or editing experience using the positioning techniques disclosed herein, e.g., using simulated physics, alignment rules, grouping, etc. Although these modules and units are shown as residing on a single device (e.g., the device 120), it should be understood that in other implementations, any combination of the these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

In some implementations, an electronic device having a processor implements a method. The method obtains input initiating positioning of a displayed object at a position in a three dimensional (3D) graphical layout. In one example, obtaining the input initiating positioning of the displayed object in the 3D layout involves obtaining 3D movement of an input object using an image sensor operatively coupled to the processor of the electronic device, e.g., to detect a hand or body gesture of a user or a movement of an input device.

After positioning the displayed object responsive to the obtained input, the method adjusts the position of the displayed object using at least one simulated physics model. As examples, the position of the displayed object may be translated in the 3D graphical layout according to simulated gravity and/or according to a collision of the displayed object with another object in the 3D graphical layout. In another example, adjusting the position of the displayed object involves determining whether the displayed object and a second displayed object share a common classification in an object taxonomy, and in accordance with a determination that the displayed object and the second displayed object share a common classification, translating at least one of the displayed object and the second displayed object towards one another. In another example, the method identifies a plane in the 3D graphical layout and adjusts the position of the displayed object by moving the displayed object onto the plane.

After adjusting the position of the displayed object, the method disables the at least one simulated physics model for the displayed object. For example, the displayed object may no longer be subject to movement based on simulated gravity or may not longer be subject to movement based on simulated collisions with the user, an input device, or other displayed objects.

In some implementations, the displayed object is grouped with a second displayed object. According to such a grouping, the second displayed object moves together with the displayed object responsive to input representing movement of the displayed object but the position of the displayed object is maintained responsive to input representing movement of the second object.

FIG. 4 is a flowchart illustrating an exemplary method of selectively using physics for scene creation. In some implementations, the method 400 is performed by a device (e.g., controller 100 or device 120 of FIGS. 1-3). The method 400 can be performed at a mobile device, head mounted device (HMD), desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 obtains input initiating positioning of an object in a three dimensional (3D) layout displayed in a user interface. In one example, a 3D app creator selects a table object to add to a layout of an app being developed, reaches out while virtually holding the table, and releases, drops, or throws the table to send the table from its location to a desired position. In some implementations, an object such as the table in this example is selected from an object shelf that includes multiple objects, e.g., tables, chairs, sofas, appliances, devices, paintings, buttons, user interface controls, etc. The input may be obtained by identifying a 3D hand gestures or a 3D movement of a 3D input device, e.g., a user moves the table using a six degree of freedom input device. The input can include a dropping action, a throwing action, a sliding action, or any other type of user-based action.

At block 404, the method 400 enables simulated physics for the object during positioning of the object in the 3D layout. In some implementations, simulated physics is enabled for only the object and not enabled for other objects. In some implementations, some objects, such as floors, walls, ceilings, and other immovable objects may have physics enabled, e.g., to prevent the user from positioning a chair halfway through a wall. In some implementations, simulated physics is enabled for the object and some of the other objects. These other objects may be selected based on selection criteria that accounts for type of the other objects, distance away of the other objects/proximity of the objects, speed of the movement or gesture by the user, whether the object is a wall or other immovable object, the user's preferences, and other criteria. The criteria can be automatically or manually selected so that the user is able to, for example, use a book to push other books but won't unintentionally knock over a stack of user interface icons. Immovable objects or other objects for which simulated physics is enabled can be highlighted or otherwise graphically distinguished from other objects. In some implementations, graphical indicators are used to distinguish or identify an active object that is being positioned as well as any immovable objects or other objects with which the active object can interact according to simulated physics.

At block 406, the method 400 positions the object in the 3D layout based on the input initiating positioning and the simulated physics. For example, the user drops the table and the table falls to the floor based on gravity. In another example, the user pushes a chair and the chair stops moving when it hits a wall. The determination of the movement can be based on physics alone, physics and alignment rules, or other combinations of movement criteria and rules.

At block 408, the method 400 disables simulated physics for the object based on determining that the positioning of the object has concluded. For example, once the object has been placed, physics is turned off for the object. Physics can be turned off immediately following the positioning, after a predetermined amount of time, or based on user input or some other event.

Figure 5:
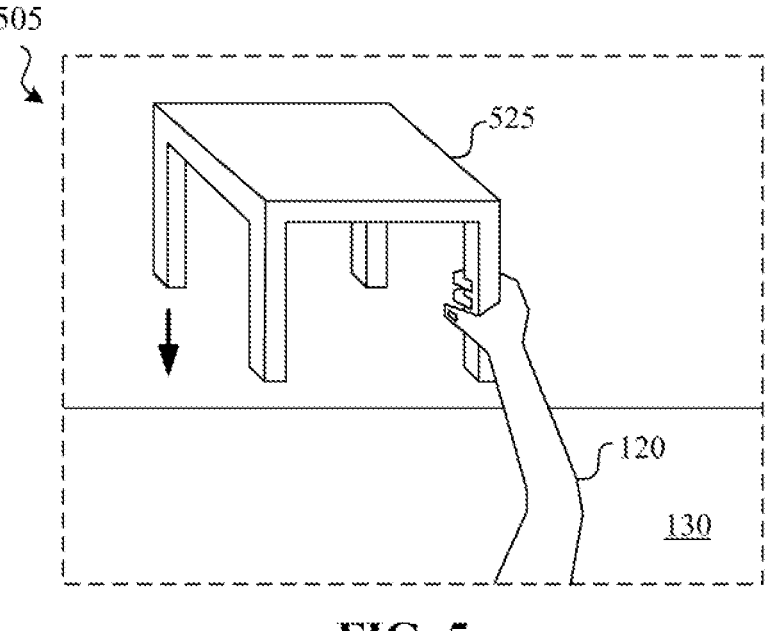
FIG. 5 is a block diagram illustrating a user action initiating placement of an object in a ER setting, according to some implementations.
Figure 6:
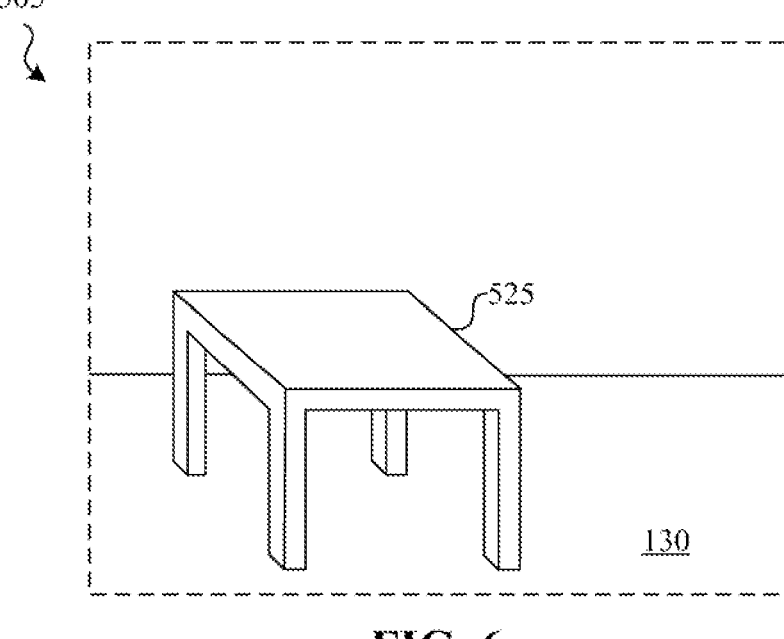
FIG. 6 is a block diagram illustrating a final position of the object of FIG. 5 after being positioned in the ER setting based on the selective use of physics according to some implementations.

FIGS. 5 and 6 illustrate an object being positioned based on the selective use of physics. FIG. 5 is a block diagram illustrating a user action initiating placement of an object 525 in ER setting 505. FIG. 5 depicts a user holding an object 525 (e.g., a virtual table) with the intention of dropping the table to position the table on the floor 130. FIG. 6 is a block diagram illustrating a final position of the object 525 after being positioned in the ER setting 505 based on the selective use of physics. Specifically the object 525 fell to the floor 130 based on gravity and is depicted in FIG. 6 in its final position.

FIG. 7 is a flowchart illustrating an exemplary method of moving an object during placement of the object in a scene according to simulated physics and to align with another object. In some implementations, the method 700 is performed by a device (e.g., controller 100 or device 120 of FIGS. 1-3). The method 700 can be performed at a mobile device, head mounted device (HMD), desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 702, the method 700 obtains input initiating positioning of an object in a 3D layout displayed in a user interface. Obtaining such input can involve similar processes as described above with respect to block 402.

At block 704, the method 700 initiates a movement of the object along a movement path based on simulated physics towards a first final position in the 3D layout. For example, the movement may be a falling of the object from a position in virtual space towards a final position on the floor. In such an example, the method 700 may detect that the object has been released and then determine a simulated fall of the object based on virtual properties of the object, e.g., mass, current velocity direction, current velocity magnitude, etc. and other properties, e.g., mass of the earth. The modeling of gravity and other physics-based movements can be based on physics equations, models, and systems of varying degrees of complexity and accuracy. For example, the method 700 may model a fall based on gravity with or without accounting for air resistance, based on simulated acceleration that mimics real gravity, or based on simulated acceleration that differs from real gravity to facilitate more efficient computation, etc.

The movement that is initiated based on simulated physics will generally be towards (via straight line, arc, etc.) a final position, but that final position need not be expressly determined when the movement is initiated. Such a final position can be, but need not be, determined initially or at a later point during the movement based on a determination that the object will come to rest in a position, e.g., resting on top of a table, a floor, against a wall, against another object, suspended by a string or other object from above, etc.

At block 706, the method 700 determines a second final position for the object based on aligning the object with a second object. The second object is identified based on the first final position, e.g., identifying that the final position is within a bounding box associated with the second object. The determination of the second final position can occur before the object has been moved to the first final position. For example, as the object starts to move towards the first final position, the method 700 may calculate a different final position to align with another object near that first final position. The alignment of the object can involve translating or rotating the object, e.g., movement in 6 degrees of freedom. As a specific example, as a chair starts moving based on gravity towards a position on a floor adjacent to a table, the method 700 identifies that the chair will land near a table and changes the final position (center coordinates and orientation in 6 degrees of freedom) of the chair to align with the table. In some implementations, determining the second final position includes determining a directional vector (e.g., front facing vector) associated with the first object and an alignment rule associated with the second object, and aligning the object with the second object based on the directional vector and the alignment rule. Such an alignment rule in the chair/table example can specify that a chair's center should be a distance X from the table's side, center, or other feature and that the chair should face the table's side, center, or other feature.

Alignment rules for an object may involve one or more bounding boxes that specify alignment for objects (e.g., objects of particular types) that are positioned within the bounding boxes. For example, a four sided table's alignment rules may specify that a chair positioned within a first bounding box associated with the table's first side be positioned based on a first set of alignment rules, a chair positioned within a second bounding box associated with the table's second side be positioned based on a second set of alignment rules, a chair positioned within a third bounding box associated with the table's third side be positioned based on a third set of alignment rules, and a chair positioned within a fourth bounding box associated with the table's fourth side be positioned based on a fourth set of alignment rules. Alignment rules may be saved as metadata for an object. For example, metadata for a table can specify how objects placed relative to certain bounding boxes should be aligned with the table.

Multiple alignment rules may apply to the positioning of an object in a particular circumstance. For example, the positioning of the chair may be based on floor alignment rules (specifying that a chair will have its legs resting against the floor) and table alignment rules (specifying the chairs orientation towards the table or a specified distance from the table). The method 700 may be configured to account for conflicting alignment rules based on alignment rule priorities, e.g., specifying that the floor's alignment rule is of higher priority than the table's alignment rule. In some implementations, the method 700 attempts to comply with alignment rules whenever doing so will not violate a physical constraint (e.g., without positioning a chair within a wall or other immovable object) or higher-priority alignment rules. In some implementations, the method 700 determines an alignment that satisfies an alignment rule as closely as possible (e.g., moving a chair 0.2 feet from a table rather than 0.5 feet from the table) while avoiding conflicting with another constraint or higher-priority alignment rule (e.g., putting the chair abutting against the wall but without going into the wall).

At block 708, the method 700 changes the movement path of the object during the movement based on the second final position. The object's movement path changes to blend or otherwise adjust the physics-based positioning with the alignment-based positioning. Blending can improve the user experience by avoiding or reducing any jerking or sudden alignment/movement at the end of a simulated physics-based movement, e.g., changing the object's orientation as it moves rather than in or after the last frame of the movement. Continuing the above chair/table example, the chair may fall downward towards the floor based on simulated gravity while the chair translated laterally to be adjacent to the table and while the chair rotates to face the center of the table. In some implementations, the movement path is depicted via multiple frames that are displayed sequentially to a user and changing the movement path involves changing the position of the object along the movement path at multiple frames.

Figure 8:
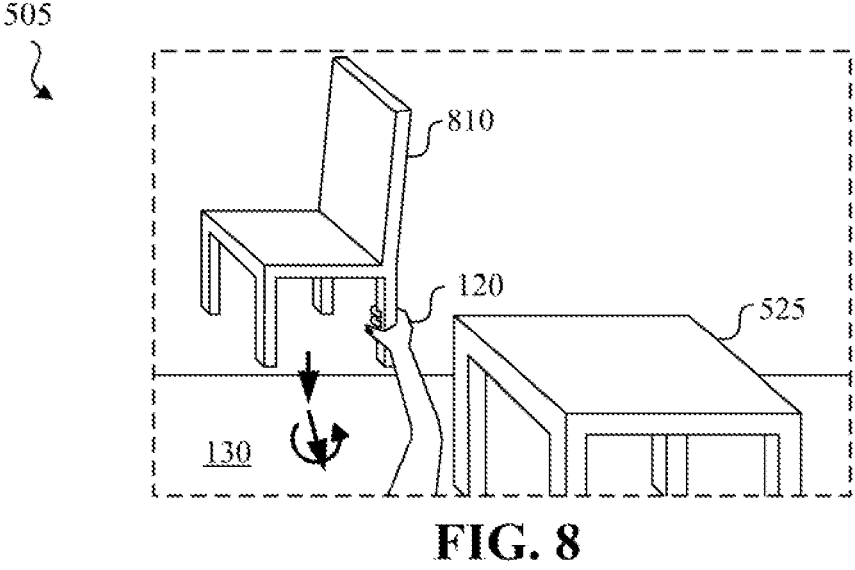
FIG. 8 is a block diagram illustrating a user action initiating placement of a second object in the ER setting of FIGS. 5 and 6.
Figure 9:
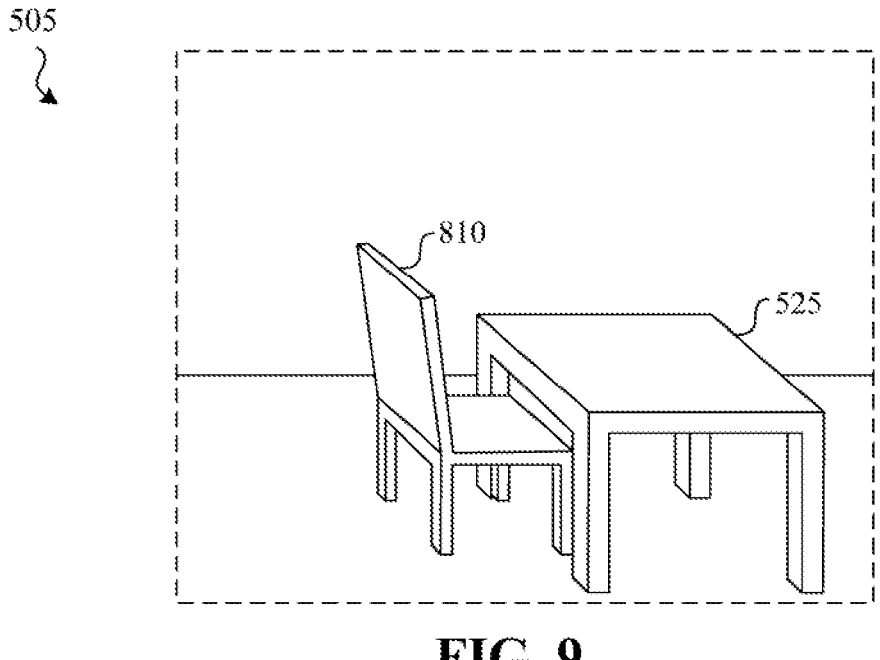
FIG. 9 is a block diagram illustrating a final position of the second object of FIG. 8 after being positioned based on the physics and alignment rules, according to some implementations.

FIGS. 8 and 9 illustrate moving an object during placement of the object according to simulated physics and to align with another object. FIG. 8 is a block diagram illustrating a user action initiating placement of a second object 810. In this example, the user holds the second object 810 (e.g., a virtual chair) out above the floor 130 near the object 525 (e.g., a virtual table) and releases the second object 810. The user intends the second object 810 to fall to floor 130 at a position adjacent to the object 525. FIG. 9 is a block diagram illustrating a final position of the second object 810 of FIG. 8 after being positioned based on the physics and alignment rules. Specifically the second object 810 initially fell straight down but changed movement path (e.g., to translate right and rotate) during the fall to come to rest in an aligned position adjacent to the object 525. The second object 810 was thus moved simultaneously based on both simulated physics and the table's alignment rules.

FIG. 10 is a flowchart illustrating an exemplary method 1000 of enabling grouping during object placement in a scene based on criteria. In some implementations, the method 1000 is performed by a device (e.g., controller 100 or device 120 of FIGS. 1-3). The method 1000 can be performed at a mobile device, head mounted device (HMD), desktop, laptop, server device, or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1002, the method 1000 obtains input initiating positioning of an object in a three dimensional (3D) layout displayed in a user interface. Obtaining such input can involve similar processes as described above with respect to block 402. At block 1004, the method 1000 positions the object in the 3D layout based on the input initiating positioning. In some implementations, the object remains at the location where a user positions it. In other implementations, the object moves to a position, for example, based on a simulated physics-based movement or alignment rules.

At block 1006, the method 1000 enables grouping of the object and a second object based on criteria where the object moves with the second object automatically in response to movement of the second object, but the object is moveable independent of the second object. The criteria can be based on proximity, e.g., objects are grouped automatically if within a predetermined distance of one another. The criteria can be based on object type(s), e.g., objects are automatically grouped based on proximity to another object's top when that other object is a table type of object. The criteria can be based on surface type, e.g., objects are automatically grouped based on the second object being a table, tray, etc. The criteria can be based on surface properties, e.g., objects are automatically grouped based on the second object being flat, approximately horizontal, etc. In some implementations, grouping is enabled based on determining that the object is within a bounding box associated with the second object, determining that the object is in contact with a particular surface of the second object, or based on determining that the object has been automatically positioned with respect to the second object based on an alignment rule.

In some implementations, objects are automatically ungrouped based on determining that the objects no longer satisfy the criteria. For example, if a vase is grouped on top of a tray, the objects may be ungrouped automatically based on detecting that the vase is no longer on the tray top surface, e.g., when a user picks the vase up and moves it to a position on top of another surface.

Figure 11:
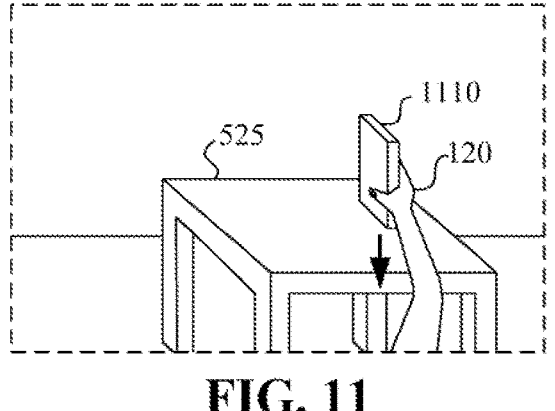
FIG. 11 is a block diagram illustrating a user action initiating placement of a second object in the ER setting of FIGS. 5 and 6.
Figure 12:
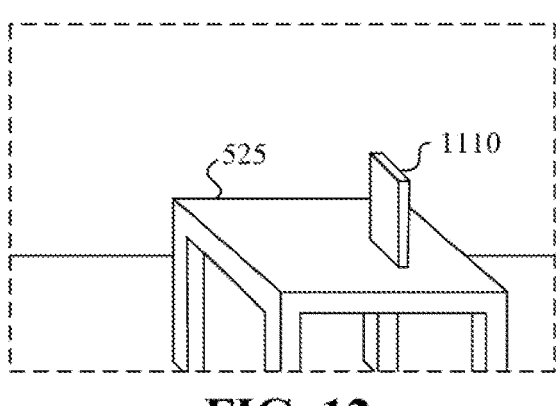
FIG. 12 is a block diagram illustrating a final position of the second object of FIG. 11 after being positioned and grouped with another object, according to some implementations.
Figure 13:
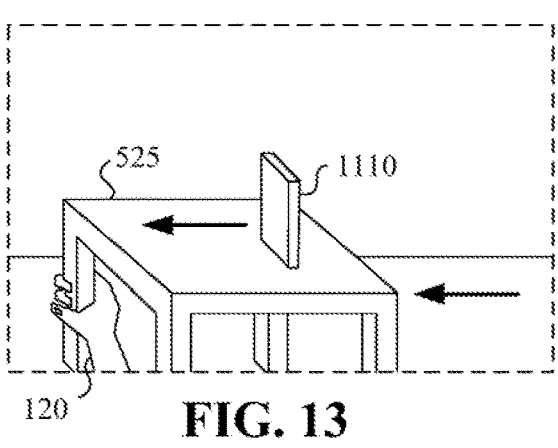
FIG. 13 is a block diagram illustrating that the second object of FIGS. 11 and 12 moves with the first object when the first object is pushed.
Figure 14:
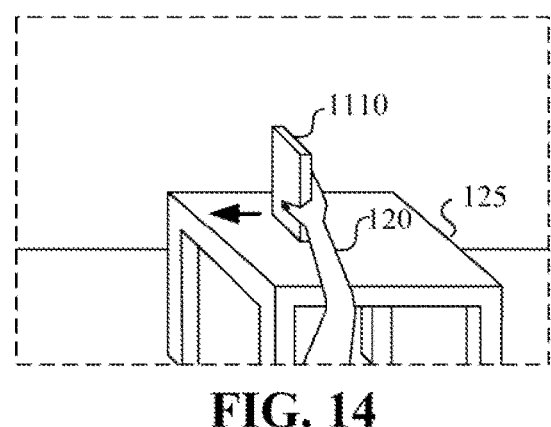
FIG. 14 is a block diagram illustrating that the second object of FIGS. 11-13 moves independently of the first object when the second object is pushed.

FIGS. 11-14 illustrate enabling grouping during object placement in a scene based on criteria. FIG. 11 is a block diagram illustrating a user action initiating placement of a second object 1110 in the ER setting of FIGS. 5 and 6. In this example, the user 120 holds the second object 1110 (e.g., a virtual book) out above the object 525 (e.g., a virtual table) and releases the second object 1110. The user 120 intends the second object 1110 to fall and rest on top of the object 525. The second object moves as expected and is automatically grouped with object 525. FIG. 12 is a block diagram illustrating a final position of the second object 1110 after being positioned and grouped on the object 525. FIG. 13 is a block diagram illustrating how the second object 1110 moves with the object 525 when the object 525 is pushed— the objects 525, 1110 move together when the object 525 is moved. Moreover, the object 1110 moves with the table 525 regardless of the speed of the movement or rotation of the table 525, remaining in the same relative position to the table 525 before, during, and after such movement. This may be unlike a movement based on simulated physics in which friction may cause the object 1110 to move with the table during a slow, horizontal movement of the table but that might result in the object 1110 falling over or sliding during a faster movement or a movement that tilts/rotates the table. FIG. 14 is a block diagram illustrating how the second object 1110 moves independent of the object 525 when the second object 1110 is pushed-the second object 1110 moves without moving the object 525.

The various implementations disclosed herein provide techniques for positioning objects that are intuitive and easy to use. When objects move based on simulated physics, such movements are generally natural to users accustomed to interacting with 3D objects according to real world physics. The selective use of such simulated physics according to some implementations herein to turn such physics on and off selectively for a particular object or objects can improve the user experience. The user can more easily avoid unintentional object interactions if simulated physics is enabled for only select objects since objects for which simulated physics is not enabled cannot be unintentionally moved, tipped over, damaged, etc.

Combining physics-based movements with alignment rule-based movements can also improve the user experience. With such object movements, the user can often avoid having to spend time tediously aligning or positioning objects. Automatic precision placement in the context of developing 3D apps and other content in a 3D development environment can save user's significant amounts of time. A user is empowered to easily drop, push, or throw objects towards intended positions. After doing so, the user views/ experiences the objects moving to appropriately aligned positions without necessarily needing to take further action. The user's interactions can be minimal, e.g., requiring that the user only roughly position an object, to achieve desired object positions.

In addition, the ability to intuitively and easily group objects for combined movement (e.g., where the grouping associates a first object with a second object such that the first object moves with the second object automatically in response to movement of the second object, but where the first object is movable independent of the second object) by enabling grouping based on criteria can also improve the user experience. Objects can be automatically grouped and then intuitively moved without the user having to painstakingly identify object groups, specify movement parameters for the objects in such groups., and later ungroup such objects. Rather objects can be automatically grouped together in appropriate circumstances, e.g., based on grouping criteria that mimic or are otherwise similar to how object's interact in the real world, move as users naturally expect, and automatically ungroup when the circumstances are no longer appropriate.

The techniques disclosed herein are applicable in numerous different contexts. In some implementations, the techniques are used to create or edit 3D content that will be included in a ER-based game, app, video, or user interface. In some implementations, the techniques are used to place objects in a room or other indoor environment in a ER setting. In other implementations, the techniques are used to place objects in a virtual outdoor world that includes, for example, trees, grass, architectural structures in an ER setting. In some implementations, the techniques are used to create ordered objects that are aligned with one another. In other implementations, the techniques are used to create random or chaotic relationships, for example, by allowing a user to drop a bucket of objects that fall and scatter according to simulated physics.

The techniques disclosed herein are applicable to rigid body objects as well as soft body objects and can be used for fluids, multi-part objects, objects that incorporate muscle system components, and objects that incorporate skeletal system components. The components within an object can be moved based on simulated physics applied to and within the object. In some implementations, objects have weight distribution or other virtual characteristics that are used in determining the movement of the objects. In some implementations, objects may bend, shatter, or break based on simulated physics based on the composition or other characteristics of the objects and bending, shattering, or breaking rules.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:

at an electronic device having a processor:

obtaining input selecting an object to be added to content being developed via a user interface of a 3D content development environment;

displaying the object in a three dimensional (3D) graphical layout in the user interface of the 3D content development environment, wherein graphical indicators identify the displayed object and other objects with which the object can interact according to at least one simulated physics model;

obtaining input initiating positioning of the displayed object at a position in the 3D graphical layout in the user interface of the 3D content development environment;

adjusting the position of the displayed object using the at least one simulated physics model and an alignment criterion that results in the displayed object changing orientation to be directionally aligned with a second object; and after adjusting the position of the displayed object, disabling the at least one simulated physics model for the displayed object, wherein the at least one simulated physics model is disabled based on user input associated with a user interface element.

2. The method of claim 1, wherein the obtaining the input initiating positioning of the displayed object in the 3D layout comprises obtaining 3D movement of an input object using an image sensor operatively coupled to the processor of the electronic device.

3. The method of claim 1, wherein adjusting the position of the displayed object comprises translating in the 3D graphical layout according to simulated gravity.

4. The method of claim 1, wherein adjusting the position of the displayed object comprises translating the displayed object according to a collision of the displayed object with another object in the 3D graphical layout.

5. The method of claim 1, wherein adjusting the position of the displayed object comprises:

determining whether the displayed object and a second displayed object share a common classification in an object taxonomy, and in accordance with a determination that the displayed object and the second displayed object share a common classification, translating at least one of the displayed object and the second displayed object towards one another.

6. The method of claim 1, further comprising:

identifying a plane in the 3D graphical layout, and wherein adjusting the position of the displayed object using at least one simulated physics model comprises moving the displayed object onto the plane.

7. The method of claim 1 further comprising: grouping the displayed object and a second displayed object, wherein grouping the displayed object and the second displayed object comprises:

moving the second displayed object together with the displayed object responsive to input representing movement of the displayed object; and maintaining the position of the displayed object responsive to input representing movement of the second displayed object.

8. A non-transitory computer-readable storage medium, storing instructions executable on a device to perform operations comprising:

obtaining input selecting an object to be added to content being developed via a user interface of a 3D content development environment;

displaying the object in a three dimensional (3D) graphical layout in the user interface of the 3D content development environment, wherein graphical indicators identify the displayed object and other objects with which the object can interact according to at least one simulated physics model:

obtaining input initiating positioning of the displayed object at a position in the a three dimensional (3D) graphical layout in the user interface of the 3D content development environment;

adjusting the position of the displayed object using the at least one simulated physics model and an alignment criterion that results in the displayed object changing orientation to be directionally aligned with a second object; and after adjusting the position of the displayed object, disabling the at least one simulated physics model for the displayed object, wherein the at least one simulated physics model is disabled based on user input associated with a user interface element.

9. The non-transitory computer-readable storage medium of claim 8, wherein the obtaining the input initiating positioning of the displayed object in the 3D layout comprises obtaining 3D movement of an input object using an image sensor.

10. The non-transitory computer-readable storage medium of claim 8, wherein adjusting the position of the displayed object comprises translating in the 3D graphical layout according to simulated gravity.

11. The non-transitory computer-readable storage medium of claim 8, wherein adjusting the position of the displayed object comprises translating the displayed object according to a collision of the displayed object with another object in the 3D graphical layout.

12. The non-transitory computer-readable storage medium of claim 8, wherein adjusting the position of the displayed object comprises:

determining whether the displayed object and a second displayed object share a common classification in an object taxonomy, and in accordance with a determination that the displayed object and the second displayed object share a common classification, translating at least one of the displayed object and the second displayed object towards one another.

13. The non-transitory computer-readable storage medium of claim 8, wherein the operations further comprise:

identifying a plane in the 3D graphical layout, and wherein adjusting the position of the displayed object using at least one simulated physics model comprises moving the displayed object onto the plane.

14. The non-transitory computer-readable storage medium of claim 8, wherein the operations further comprise grouping the displayed object and a second displayed object, wherein grouping the displayed object and the second displayed object comprises:

moving the second displayed object together with the displayed object responsive to input representing movement of the displayed object; and maintaining the position of the displayed object responsive to input representing movement of the second object.

15. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining input selecting an object to be added to content being developed via a user interface of a 3D content development environment;

displaying the object in a three dimensional (3D) graphical layout in the user interface of the 3D content development environment, wherein graphical indicators identify the displayed object and other objects with which the object can interact according to at least one simulated physics model;

obtaining input initiating positioning of the displayed object at a position in the 3D graphical layout in the user interface of the 3D content development environment;

adjusting the position of the displayed object using the at least one simulated physics model and an alignment criterion that results in the displayed object changing orientation to be directionally aligned with a second object; and after adjusting the position of the displayed object, disabling the at least one simulated physics model for the displayed object, wherein the at least one simulated physics model is disabled based on user input associated with a user interface element.

16. The system of claim 15, wherein the obtaining the input initiating positioning of the displayed object in the 3D layout comprises obtaining 3D movement of an input object using an image sensor.

17. The system of claim 15, wherein adjusting the position of the displayed object comprises translating in the 3D graphical layout according to simulated gravity.

18. The system of claim 15, wherein adjusting the position of the displayed object comprises translating the displayed object according to a collision of the displayed object with another object in the 3D graphical layout.

19. The system of claim 15, wherein adjusting the position of the displayed object comprises:

determining whether the displayed object and a second displayed object share a common classification in an object taxonomy, and in accordance with a determination that the displayed object and the second displayed object share a common classification, translating at least one of the displayed object and the second displayed object towards one another.

20. The system of claim 15, wherein the operations further comprise:

identifying a plane in the 3D graphical layout, and wherein adjusting the position of the displayed object using at least one simulated physics model comprises moving the displayed object onto the plane.

21. The method of claim 1, wherein graphical indicators distinguish:

a first set of objects with respect to which the displayed object can interact via physics-based interactions; and a second set of objects with respect to which the displayed object cannot interact via physics-based interactions.

22. The method of claim 1, wherein the alignment criteria specify different alignment rules for different sides of the second object.

23. The method of claim 1, wherein the alignment criteria specify an orientation of a directional vector associated with the displayed object relative to the second object.

24. The method of claim 1, wherein the alignment criteria specify that the displayed object face a side of the second object.

25. The method of claim 1, wherein the alignment criteria specify that the displayed object be positioned within a bounding box associated with the second object.

26. The method of claim 1, wherein the alignment criteria specify that the displayed object be positioned within a bounding box associated with a particular side of the second object.

27. The method of claim 1, wherein the alignment criteria are stored as object-specific metadata.

28. The method of claim 1, wherein the alignment criteria comprise multiple alignment rules applicable to positioning the displayed object in a particular circumstance.

29. The method of claim 1, wherein the displayed object is aligned with the second object based on applying multiple alignment rules according to alignment rule priorities that account for conflicting alignment rules.

30. The method of claim 1, wherein the displayed object is aligned by complying with the alignment criteria in a way determined to not conflict with a physical constraint.

* * * * *